US012476526B2

(12) United States Patent
Pal et al.

(10) Patent No.: US 12,476,526 B2
(45) Date of Patent: Nov. 18, 2025

(54) MIXED FLUX MOTOR WITH INTEGRATED JOURNAL AND THRUST BEARINGS

(71) Applicant: Hamilton Sundstrand Corporation, Charlotte, NC (US)

(72) Inventors: Debabrata Pal, Hoffman Estates, IL (US); Viktor Kilchyk, Lancaster, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 314 days.

(21) Appl. No.: 18/297,444

(22) Filed: Apr. 7, 2023

(65) Prior Publication Data

US 2024/0339905 A1 Oct. 10, 2024

(51) Int. Cl.
*H02K 21/24* (2006.01)
*B33Y 80/00* (2015.01)
(Continued)

(52) U.S. Cl.
CPC ......... *H02K 21/24* (2013.01); *F04D 13/0666* (2013.01); *H02K 1/2793* (2013.01); *B33Y 80/00* (2014.12)

(58) Field of Classification Search
CPC .. H02K 1/2793; H02K 1/2795; H02K 1/2796; H02K 1/2798
See application file for complete search history.

(56) References Cited

U.S. PATENT DOCUMENTS 6,244,835 B1 * 6/2001 Antaki ............... F04D 13/0646
417/423.1
6,426,577 B1 7/2002 Sekiyama et al.
(Continued)

FOREIGN PATENT DOCUMENTS

CN 112088487 A * 12/2020 ............. F25B 1/053
CN 112531958 A 3/2021
(Continued)

OTHER PUBLICATIONS

18297444_2025-04-08_CN_112088487_A_H.pdf (Year: 2025).*
(Continued)

*Primary Examiner* — Christopher M Koehler
*Assistant Examiner* — Ahmed F Seck
(74) *Attorney, Agent, or Firm* — Kinney & Lange, P.A.

(57) ABSTRACT

An assembly includes a rotor shaft extending in an axial direction along a center axis of the assembly and a flange extending radially outward from the rotor shaft and circumferentially around the rotor shaft. An axial flux motor extends circumferentially around the rotor shaft. The axial flux motor includes an array of magnets, a stator support structure, and a plurality of coils. The array of magnets extending circumferentially around the rotor shaft. The stator support structure extends circumferentially around the rotor shaft and faces the flange. The plurality of coils extends circumferentially around the rotor shaft and faces the array of magnets in the axial direction. Each coil of the plurality of coils includes bearing windings and torque generating windings on the stator support structure. Both the bearing windings and the torque generating windings face the array of magnets in the axial direction.

15 Claims, 6 Drawing Sheets

(51) Int. Cl.
    *F04D 13/06*     (2006.01)
    *H02K 1/2793*     (2022.01)

(56) References Cited

U.S. PATENT DOCUMENTS

| | | | |
|---|---|---|---|
| 9,863,431 | B2 | 1/2018 | Da Silva et al. |
| 10,208,759 | B2 | 2/2019 | Carrasco et al. |
| 11,539,251 | B2 | 12/2022 | Wang et al. |
| 2020/0036243 | A1* | 1/2020 | Zhao .................. H02K 1/145 |
| 2020/0350804 | A1 | 11/2020 | Ono et al. |
| 2022/0109356 | A1 | 4/2022 | Corey, III et al. |
| 2022/0320981 | A1* | 10/2022 | Policandriotes ..... H02K 1/2796 |
| 2023/0020812 | A1 | 1/2023 | King et al. |

FOREIGN PATENT DOCUMENTS

| | | |
|---|---|---|
| CN | 113965010 A | 1/2022 |
| CN | 217682845 U | 10/2022 |
| CN | 115589089 A | 1/2023 |
| EP | 2555394 A1 | 2/2013 |

OTHER PUBLICATIONS

Extended European Search Report dated Oct. 4, 2024, for corresponding European Patent Application No. 24168538.7, 14 pgs.
Mark Hinckley, New Levels of Performance with Magnetic Bearings, Design World Staff article, Oct. 8, 2010, pp. 4, Lansdale, PA.

* cited by examiner

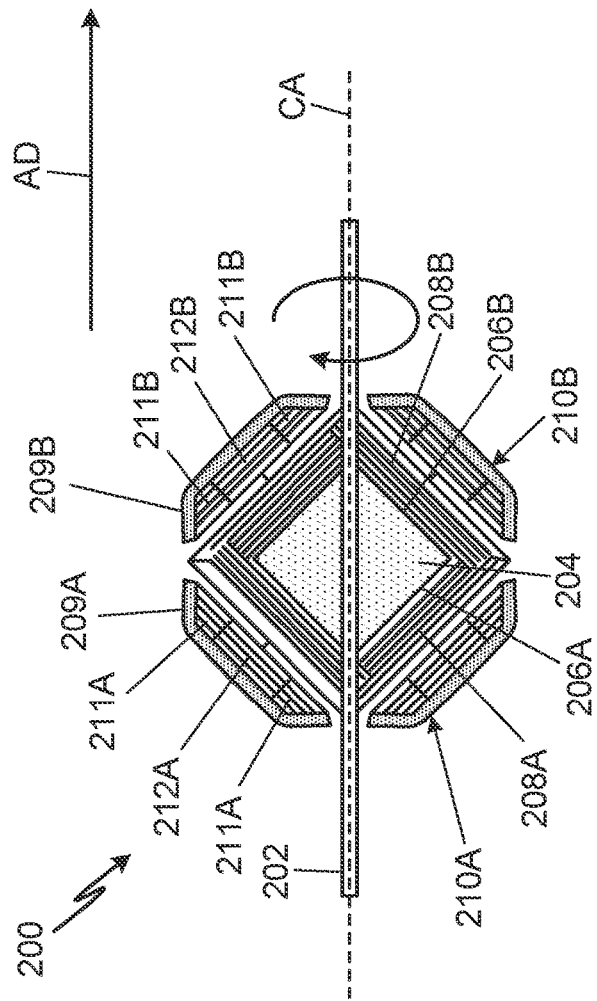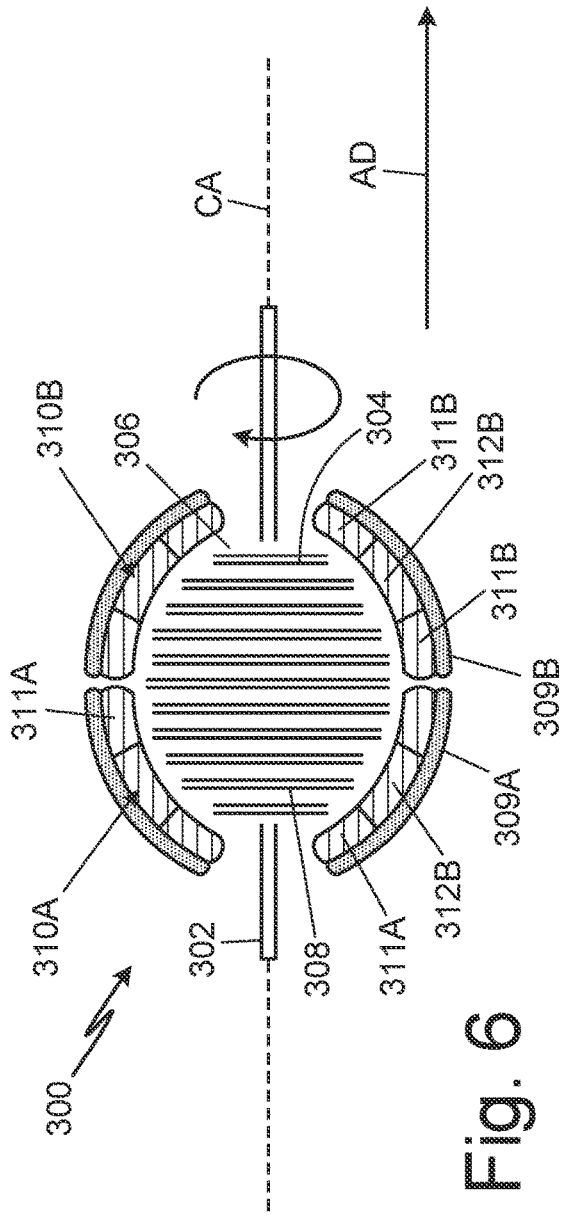

MIXED FLUX MOTOR WITH INTEGRATED JOURNAL AND THRUST BEARINGS

BACKGROUND

This disclosure is directed to electric motors, and in particular, to electric motors with magnetic bearings.

Electric motors have a rotor assembly driven by a stator. The rotor assembly of an electric motor generally requires stabilization in the axial direction and in the radial direction to keep the rotor assembly centered and spaced relative to the stator. Radial bearings, such as journal bearings, prevent radial movement of the rotor assembly relative to a center axis. Axial bearings, such as thrust bearings, prevent axial movement of the rotor assembly relative to the center axis. Traditional mechanical radial bearings and axial bearings are subject to physical wear and require maintenance. Magnetic bearings can stabilize and support a rotor assembly without the same physical wear as traditional mechanical bearings. However, magnetic bearings can be heavy and significantly increase the length of an electric motor assembly.

SUMMARY

An assembly includes a rotor shaft extending in an axial direction along a center axis of the assembly and a flange extending radially outward from the rotor shaft and circumferentially around the rotor shaft. An axial flux motor extends circumferentially around the rotor shaft. The axial flux motor includes an array of magnets, a stator support structure, and a plurality of coils. The array of magnets extending circumferentially around the rotor shaft. The stator support structure extends circumferentially around the rotor shaft and faces the flange. The plurality of coils extends circumferentially around the rotor shaft and faces the array of magnets in the axial direction. Each coil of the plurality of coils includes bearing windings and torque generating windings on the stator support structure. Both the bearing windings and the torque generating windings face the array of magnets in the axial direction.

An assembly includes a rotor shaft extending in an axial direction along a center axis of the assembly and a flange extending radially outward from the rotor shaft and circumferentially around the rotor shaft. An axial flux motor extends circumferentially around the rotor shaft. The axial flux motor includes a first array of magnets on the flange that extends circumferentially around the rotor shaft. A first stator support structure extends circumferentially around the rotor shaft and faces the flange. A first plurality of coils is on the first stator support structure. The first plurality of coils extends circumferentially around the rotor shaft and faces the first array of magnets in the axial direction. Each coil of the first plurality of coils includes both first bearing windings and first torque generating windings. The first bearing windings are on the first stator support structure and face the first array of magnets in the axial direction. The first torque generating windings are also on the first stator support structure and face the first array of magnets in the axial direction. The assembly also includes a radial flux motor. The radial flux motor includes a second array of magnets on the rotor and a second stator support structure extending circumferentially around the second array of magnets on the rotor shaft. A second plurality of coils is on the second stator support structure. The second plurality of coils extends circumferentially around the second array of magnets and is spaced radially from the second array of magnets. Each coil of the second plurality of coils includes second bearing windings and second torque generating windings. The second bearing windings are on the second stator support structure and are spaced radially from the second array of magnets. The second torque generating windings are on the second stator support structure and are spaced radially from the second array of magnets.

A mixed flux motor includes a rotor with a surface extending along a center axis in an axial direction relative to the center axis and in a radial direction relative to the center axis such that the surface is non-parallel with the center axis and non-perpendicular with the center axis. An array of magnets are connected to the surface of the rotor and extend parallel to the surface of the rotor. The array of magnets is arranged around the center axis. A stator support structure is centered on the center axis and spaced from the surface of the rotor and the array of magnets. A plurality of coils is on the stator support structure and faces the array of magnets. Each coil of the plurality of coils includes bearing windings and torque generating windings on the stator support structure. The bearing windings face the array of magnets and are parallel to the array of magnets. The torque generating windings face the array of magnets and are parallel to the array of magnets.

BRIEF DESCRIPTION OF THE DRAWINGS

FIG. 5 is a cross-sectional view of a mixed flux motor that includes a magnetic bearing integrated into the mixed flux motor.

FIG. 6 is a cross-sectional view of another mixed flux motor that includes a magnetic bearing integrated into the mixed flux motor.

While the above-identified drawing figures set forth one or more examples, other examples are also contemplated. It should be understood that numerous other modifications and examples can be devised by those skilled in the art, which fall within the scope and spirit of the principles of the claims.

DETAILED DESCRIPTION

A drive assembly is disclosed that includes an axial flux motor and a radial flux motor. The radial flux motor radially supports a rotor shaft of the drive assembly while also rotating the rotor shaft. Coils of the axial flux motor include windings that rotate the rotor shaft when energized. The coils of the axial flux motor include additional windings that acts as a magnetic thrust bearing to control an axial position of the rotor shaft. Thus, the axial flux motor can stabilize the rotor shaft in the axial direction while also driving rotation of the rotor shaft. The drive assembly can also include a mixed flux motor that controls a radial position and an axial position of a rotor shaft while also driving rotation of the rotor shaft. The drive assembly is discussed in greater detail below with reference to FIGS. 1-7.

Figure 1:
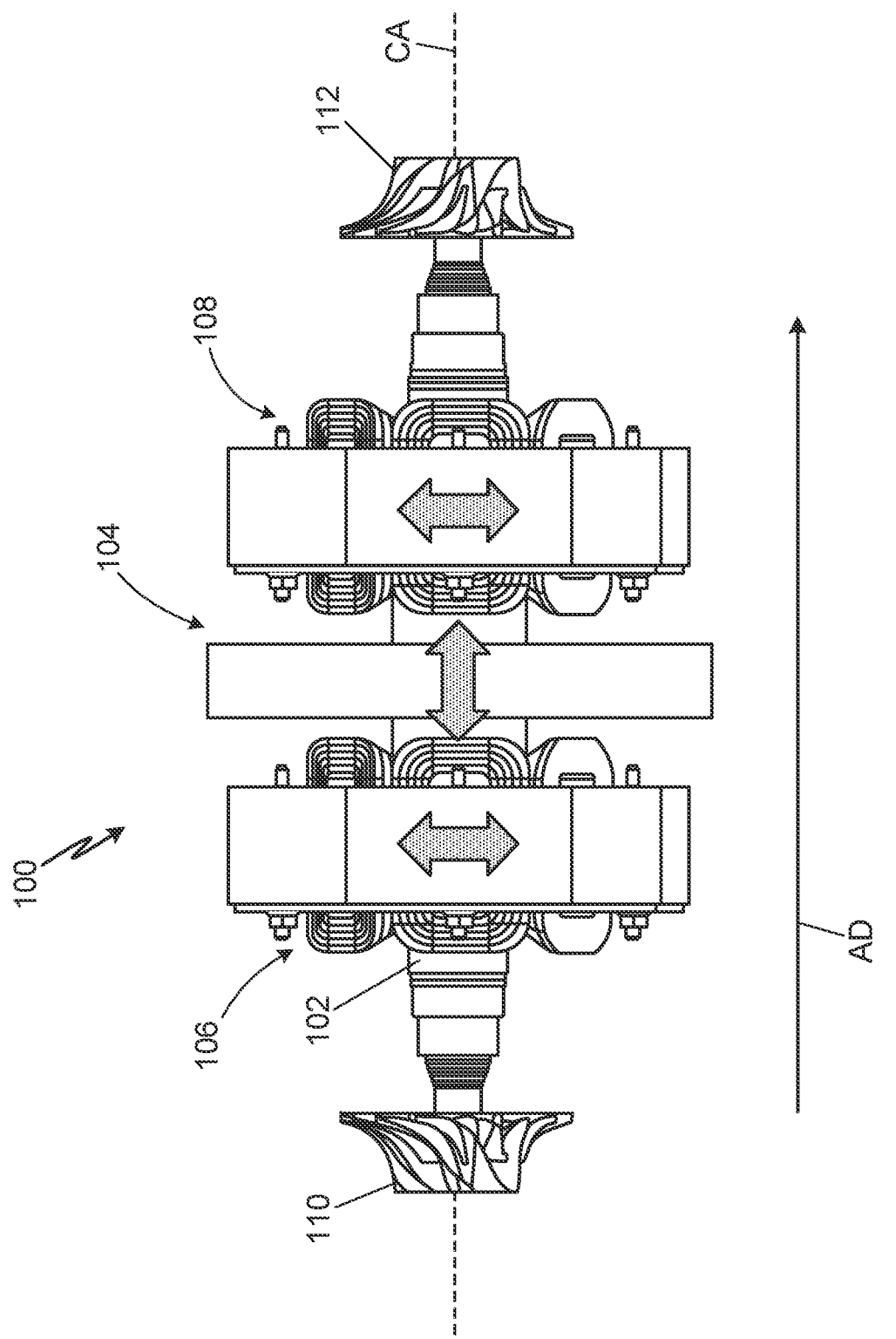
FIG. 1 is a side elevation view of a drive assembly comprising a rotor shaft, an axial flux motor with additional windings that function as an integrated magnetic thrust bearing, a first radial flux motor with additional windings that function as a first integrated magnetic journal bearing, and a second radial flux motor with additional windings that function as a second integrated magnetic journal bearing.

FIG. 1 is a side elevation view of drive assembly 100. As shown in FIG. 1, drive assembly 100 includes rotor shaft 102, axial flux motor 104, first radial flux motor 106, second radial flux motor 108, first impeller 110, and second impeller 112. Rotor shaft 102 extends in an axial direction AD along center axis CA. The axial direction AD is defined herein as a direction that is parallel with center axis CA. Axial flux motor 104 extends circumferentially around rotor shaft 102 and is positioned between first radial flux motor 106 and second radial flux motor 108 relative to the axial direction AD. First impeller 110 is connected to an end of rotor shaft 102 and second impeller is connected to rotor shaft 102 at an opposite end of rotor shaft 102 from first impeller 110. First radial flux motor 106 and second radial flux motor 108 both provide torque to rotate rotor shaft 102. The coils of first radial flux motor 106 and second radial flux motor 108 each include additional windings that functions as radial magnetic journal bearings that control a radial position rotor shaft 102 relative to center axis CA. Axial flux motor 104 can also rotate rotor shaft 102 along with first radial flux motor 106 and second radial flux motor 108. As discussed in greater detail below with reference to FIG. 2, the coils of axial flux motor 104 include additional windings that function as an axial magnetic thrust bearing that can control an axial position of rotor shaft 102.

Figure 2:
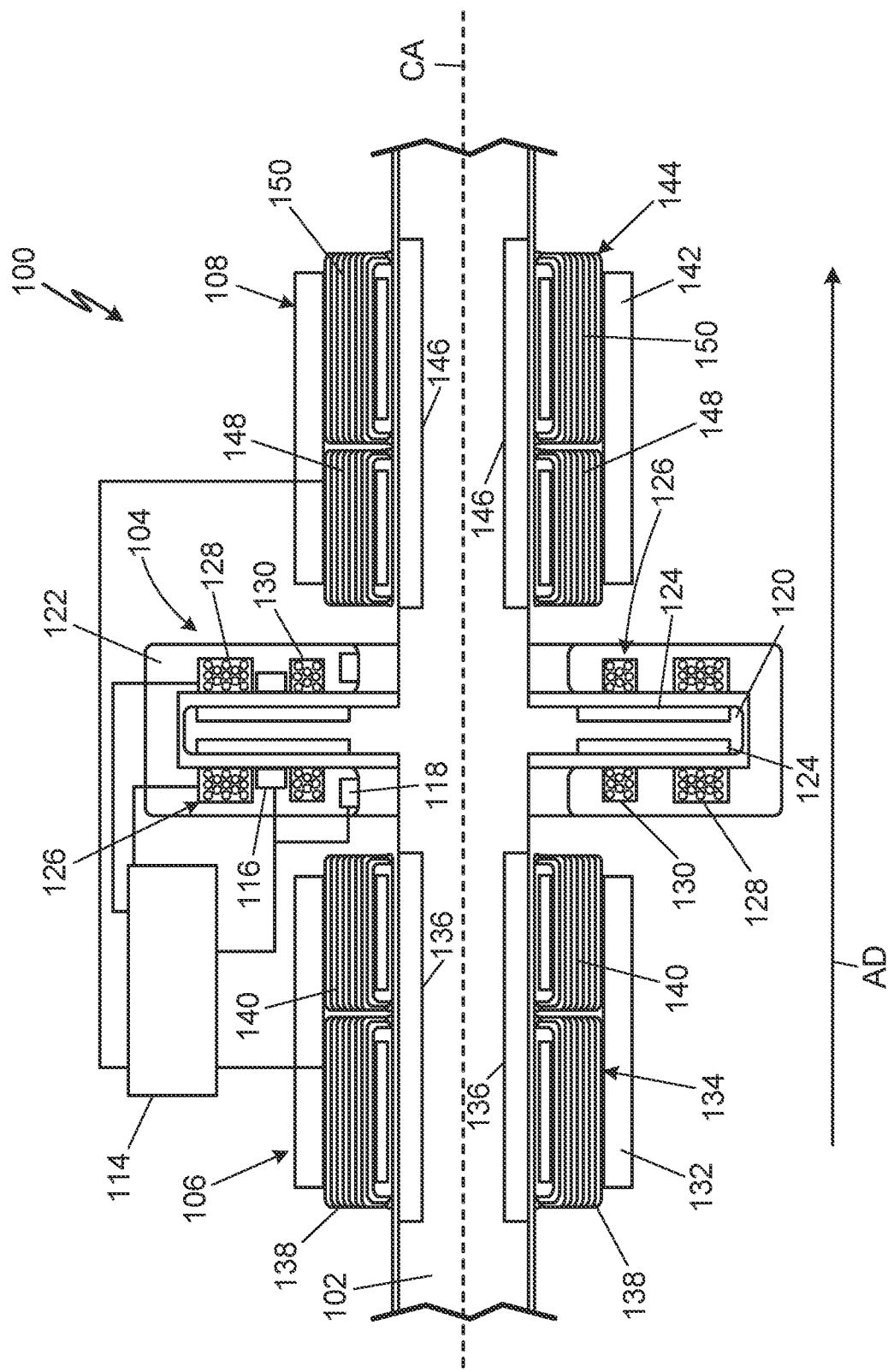
FIG. 2 is a cross-sectional view of the drive assembly of FIG. 1.

FIG. 2 is a cross-sectional view of drive assembly 100 from FIG. 1. As shown in FIG. 2, drive assembly 100 also includes controller 114, axial position sensor 116, and radial position sensor 118. Axial flux motor 104 includes flange 120, stator support structure 122, first array of magnets 124, and first plurality of coils 126 with first bearing windings 128 and first torque generating windings 130. First radial flux motor 106 includes second stator support structure 132, second plurality of coils 134, and second array of magnets 136. Additionally, second array of magnets 136 includes sub-array of rotor magnets 136A and sub-array of rotor magnets 136B, where sub-array of motor magnets 136A and sub-array of motor magnets 136B are separate magnet arrays. The second plurality of coils 134 of first radial flux motor 106 includes second bearing windings 138 and second torque generating windings 140. Flux from second bearing windings 138 interacts with sub-array of rotor magnets 136A to keep rotor shaft 102 spaced radially from the second plurality of coils 134. Flux from second torque generating windings 140 interacts with sub-array of rotor magnets 136B to rotate sub-array of rotor magnets 136B and rotor shaft 102. Second radial flux motor 108 includes third stator support structure 142, third plurality of coils 144, and third array of magnets 146. The third array of magnets 146 includes sub-array of rotor magnets 146A and sub-array of rotor magnets 146B, where sub-array of motor magnets 146A and sub-array of motor magnets 146B are separate magnet arrays. The third plurality of coils 144 of second radial flux motor 108 includes third bearing windings 148 and third torque generating windings 150. Flux from third bearing windings 148 interacts with sub-array of rotor magnets 146A to keep rotor shaft 102 spaced radially from the third plurality of coils 144. Flux from third torque generating windings 150 interacts with sub-array of rotor magnets 146B to rotate sub-array of rotor magnets 146B and rotor shaft 102.

Flange 120 extends radially outward from rotor shaft 102 and extends circumferentially around rotor shaft 102. Flange 120 can be integral with rotor shaft 102 and rotates with rotor shaft 102. The first array of magnets 124 is located on flange 120 and extends circumferentially around rotor shaft 102 on flange 120. The first array of magnets 124 can comprise permanent magnets and/or sintered magnets. First stator support structure 122 extends circumferentially around rotor shaft 102 and faces flange 120. In the example of FIG. 2, first stator support structure 122 extends circumferentially around flange 120 and includes a circumferential channel that receives flange 120. The first plurality of coils 126 are on first stator support structure 122 and are arranged on first stator support structure 122 such the first plurality of coils 126 extends circumferentially around rotor shaft 102. The first plurality of coils 126 faces the first array of magnets 124 in the axial direction AD. Each coil 124 of the first plurality of coils 124 includes first bearing windings 128 and first torque generating windings 130. First bearing windings 128 are on first stator support structure 122 and face the first array of magnets 124 in the axial direction AD. First torque generating windings 130 are also on first stator support structure 122 and also face the first array of magnets 124 in the axial direction AD. First torque generating windings 130 are electrically connected to first bearing windings 128 such that first torque generating windings 130 receive current from first bearing windings 128. First torque generating windings 130 are spaced radially from first bearing windings 128 and can be wound on first stator support structure 122 in a different direction than first bearing windings 128 so that current passing through first torque generating windings 130 will create axial magnetic flux that interacts with the first array of magnets 124 to rotate rotor shaft 102. Electrical current passing through first bearing windings 128 will create axial magnetic flux that interacts with the first array of magnets 124 to space flange 120 from first stator support structure 122 in the axial direction AD.

Axial position sensor 116 is on first stator support structure 122 to sense a position of flange 120 relative to first stator support structure 122. Axial position sensor 116 can be an inductive gap sensor. Axial position sensor 116 is in electrical communication with controller 114 and sends an electrical signal to controller 114 representing the axial position of flange 120 relative to first stator support structure 122. Controller 114 can adjust the electrical current supplied to first bearing windings 128 to adjust an axial position of rotor shaft 102 and flange 120 to maintain a proper gap between the first plurality of coils 126 and the first array of magnets 124. Controller 114 can also adjust the electrical current supplied to first torque generating windings 130 to adjust a rotational speed or power of rotor shaft 102.

The second array of magnets 136 are connected to rotor shaft 102 and are arranged circumferentially around rotor shaft 102. Second stator support structure 132 of first radial flux motor 106 extends circumferentially around the second array of magnets 136 on rotor shaft 102. The second plurality of coils 134 are on second stator support structure 132 and extends circumferentially around the second array of magnets 136. The second plurality of coils 134 are spaced radially from the second array of magnets 136. Each coil 134 of the second plurality of coils 134 includes second bearing windings 138 and second torque generating windings 140. Second bearing windings 138 are on second stator support structure 132 and are spaced radially from the second array of magnets 136. Second torque generating windings 140 are also on second stator support structure 132 and are spaced radially from the second array of magnets 136. Second torque generating windings 140 are electrically connected to second bearing windings 138 such that second torque generating windings 140 receive current from second bearing windings 138. Second torque generating windings 140 are spaced axially from second bearing windings 138 and can be wound on second stator support structure 132 in a different direction than second bearing windings 138 so that current passing through second torque generating windings 140 will create radial magnetic flux that interacts with the second array of magnets 136 to rotate rotor shaft 102. Electrical current passing through second bearing windings 138 will create radial magnetic flux that interacts with the second array of magnets 136 to radially space rotor shaft 102 from second stator support structure 132 and center rotor shaft 102 on center axis CA.

The third array of magnets 146 are connected to rotor shaft 102 and are arranged circumferentially around rotor shaft 102. Third stator support structure 142 of second radial flux motor 108 extends circumferentially around the third array of magnets 146 on rotor shaft 102. The third plurality of coils 144 are on third stator support structure 142 and extends circumferentially around the third array of magnets 146. The third plurality of coils 144 are spaced radially from the third array of magnets 146. Each coil 144 of the third plurality of coils 144 includes third bearing windings 148 and third torque generating windings 150. Third bearing windings 148 are on third stator support structure 142 and are spaced radially from the third array of magnets 146. Third torque generating windings 150 are also on third stator support structure 142 and are spaced radially from the third array of magnets 146. Third torque generating windings 150 are electrically connected to third bearing windings 148 such that third torque generating windings 150 receive current from third bearing windings 148. Third torque generating windings 150 are spaced axially from third bearing windings 148 and can be wound on third stator support structure 142 in a different direction than third bearing windings 148 so that current passing through third torque generating windings 150 will create radial magnetic flux that interacts with the third array of magnets 146 to rotate rotor shaft 102. Electrical current passing through third bearing windings 148 will create radial magnetic flux that interacts with the third array of magnets 146 to radially space rotor shaft 102 from third stator support structure 142 and center rotor shaft 102 on center axis CA.

Radial position sensor 118 is on first stator support structure 122 to sense a position of rotor shaft 102 relative to second stator support structure 132 and third stator support structure 142. Radial position sensor 118 can be an inductive gap sensor. Radial position sensor 118 is in electrical communication with controller 114 and sends an electrical signal to controller 114 representing the radial position of rotor shaft 102 relative to second stator support structure 132 and third stator support structure 142. Controller 114 can adjust the electrical current supplied to second bearing windings 138 and third bearing windings 148 to adjust an axial position of rotor shaft 102 to maintain a proper gap between the second plurality of coils 134 and the second array of magnets 136 and to maintain a proper gap between the third plurality of coils 144 and the third array of magnets 146. Controller 114 can also adjust the electrical current supplied to second torque generating windings 140 and third torque generating windings 150 to adjust a rotational speed or power of rotor shaft 102. During operation, controller 114 can adjust electrical current to axial flux motor 104, first radial flux motor 106, and second radial flux motor 108 to vary and/or maximize the torque or speed of rotor shaft 102.

Figure 3:
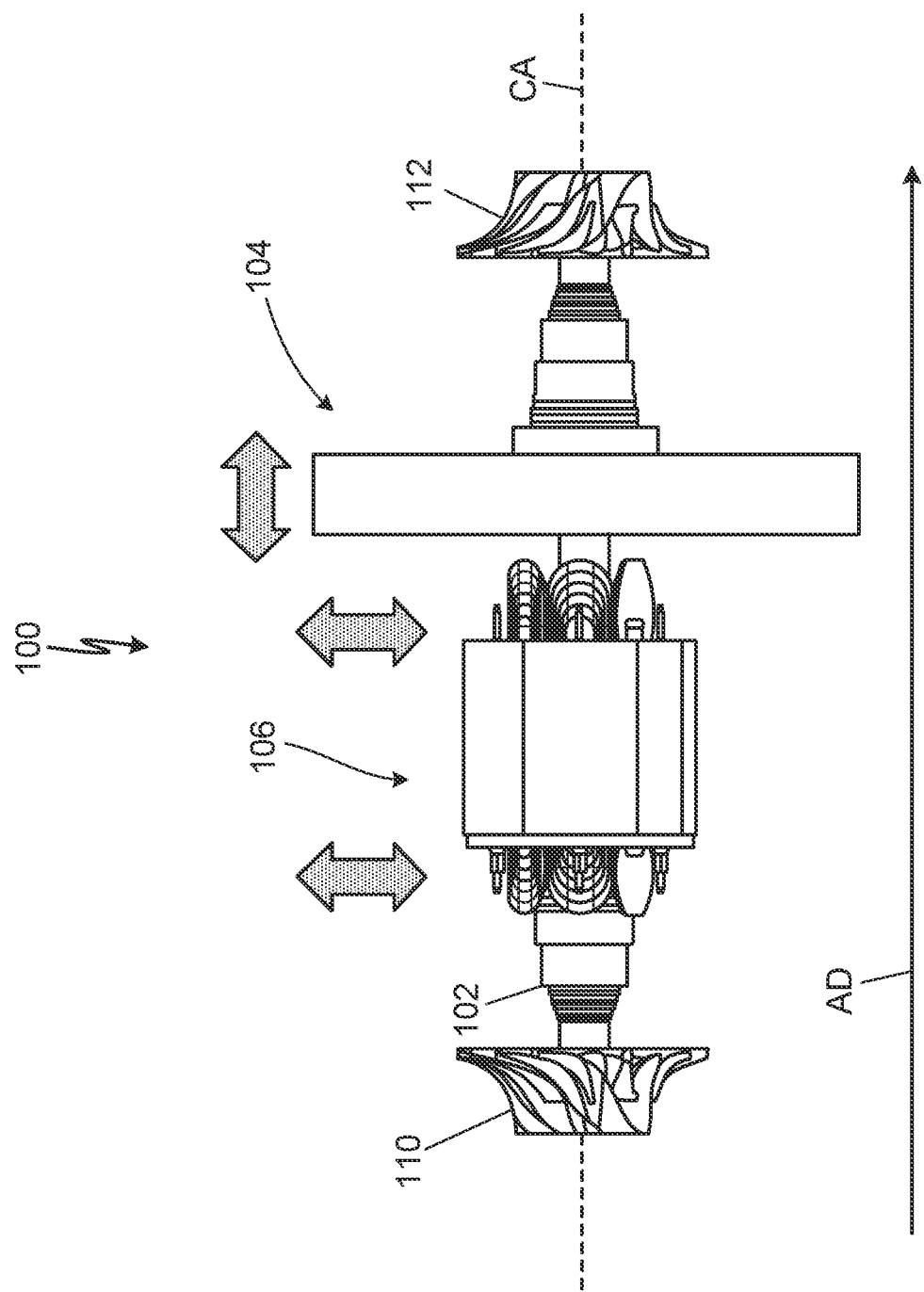
FIG. 3 is a side elevation view of a drive assembly comprising a rotor shaft, an axial flux motor with additional windings that function as an integrated magnetic thrust bearing, and a radial flux motor with additional windings that function as an integrated magnetic journal bearing.

FIG. 3 is a side elevation view of another example of drive assembly 100. As shown in FIG. 3, drive assembly 100 from FIGS. 1 and 2 can be simplified such that drive assembly 100 only includes axial flux motor 104 and single radial flux motor 106. Axial flux motor 104 shown in FIG. 3 includes the same parts and configuration as axial flux motor 104 described above with reference to FIGS. 1 and 2. As discussed above axial flux motor 104 includes coils with windings that provide torque to rotor shaft 102 and additional windings that function as a magnetic axial thrust bearing to stabilize rotor shaft 102 in the axial direction AD. Single radial flux motor 106 shown in FIG. 3 includes the same parts and configuration as first radial flux motor 106 described above with reference to FIGS. 1 and 2. Single radial flux motor 106 includes coils with windings that provide torque to rotor shaft 102 and additional windings that function as magnetic journal bearings to stabilize rotor shaft 102 in the radial direction relative to center axis CA.

Figure 4:
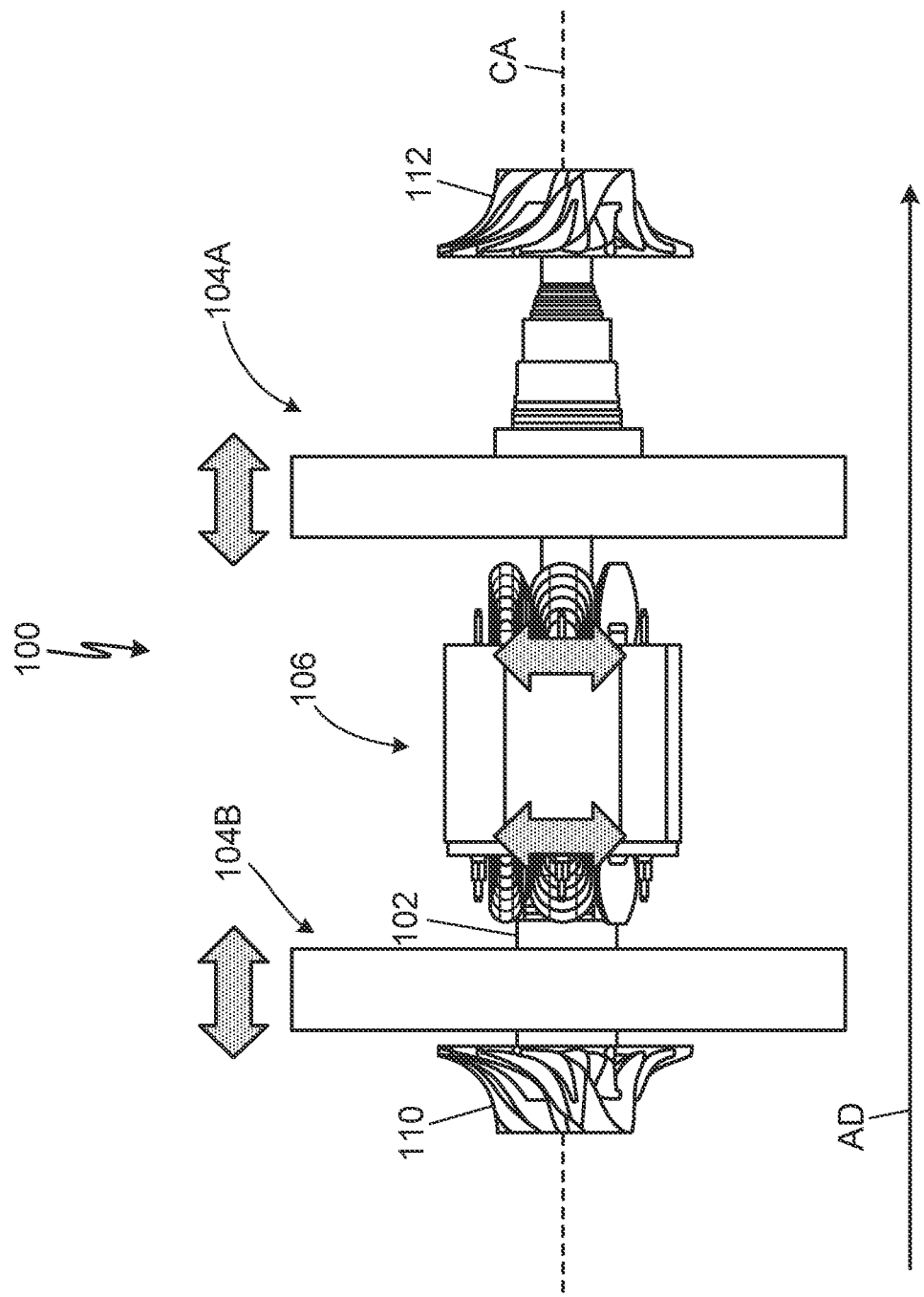
FIG. 4 is a side elevation view of a drive assembly comprising a rotor shaft, a first axial flux motor with additional windings that function as a first integrated magnetic thrust bearing, a second axial flux motor with additional windings that function as a second integrated magnetic thrust bearing, and a radial flux motor with additional windings that function as an integrated magnetic journal bearing.

FIG. 4 is a side elevation view of another example of drive assembly 100. In the example of FIG. 4, drive assembly 100 includes first axial flux motor 104A, second axial flux motor 104B, and radial flux motor 106. Radial flux motor 106 is disposed on rotor shaft 102 in the axial direction AD between first axial flux motor 104A and second axial flux motor 104B. Radial flux motor 106 shown in FIG. 4 includes the same parts and configuration as first radial flux motor 106 described above with reference to FIGS. 1 and 2. As discussed above, radial flux motor 106 includes coils with windings that provide torque to rotor shaft 102 and additional windings that function as magnetic journal bearings to stabilize rotor shaft 102 in the radial direction relative to center axis CA. First axial flux motor 104A shown in FIG. 4 includes the same parts and configuration as axial flux motor 104 described above with reference to FIGS. 1 and 2. Second axial flux motor 104B shown in FIG. 4 includes the same parts and configuration as axial flux motor 104 described above with reference to FIGS. 1 and 2. Since the example of drive assembly 100 in FIG. 4 includes second axial flux motor 104B, a second flange (not shown) extends radially outward from rotor shaft 102 similar to flange 120 shown in FIG. 2. As discussed above first axial flux motor 104A and second axial flux motor 104B each includes coils with windings that provide torque to rotor shaft 102 and additional windings that function as a magnetic axial thrust bearing to stabilize rotor shaft 102 in the axial direction AD.

FIG. 5 is a cross-sectional view of mixed flux motor 200. As shown in FIG. 5, mixed flux motor 200 includes rotor 202, rotor core 204, first surface 206A, second surface 206B, a first array of magnets 208A, a second array of magnets 208B, first stator support structure 209A, second stator support structure 209B, first plurality of coils 210A, and second plurality of coils 210B. The first plurality of coils 210A includes first bearing windings 211A and first torque generating windings 212A. The second plurality of coils 210B includes second bearing windings 211B and second torque generating windings 212B.

Rotor core 204, first surface 206A, and second surface 206B can be formed from additive manufacturing. First surface 206A is a conical surface formed on rotor core 204. First surface 206A extends in the axial direction AD and in a radial direction relative to center axis CA such that first surface 206A is non-parallel with center axis CA and non-perpendicular with center axis CA. First surface 206A tapers radially outward as first surface 206A extends in the axial direction AD. Second surface 206B is also a conical surface formed on rotor core 204. Second surface 206B extends in the axial direction AD and in the radial direction relative to center axis CA such that second surface 206B is non-parallel with center axis CA and non-perpendicular with center axis CA. Second surface 206B tapers radially inward as second surface 206B extends in the axial direction AD. Together, first surface 206A and second surface 206B can form a bicone.

The first array of magnets 208A is connected to first surface 206A of rotor 202, is arranged around center axis CA, and is arranged conically on first surface 206A such that the first array of magnets 208A extends parallel to first surface 206A. The first array of magnets 208A is arranged conically on the first surface 206A such that the first array of magnets 208A comprises flux lines that extend perpendicular relative to first surface 206A surface. The second array of magnets 208B is connected to second surface 206B of rotor 202, is arranged around center axis CA, and is arranged conically on second surface 206B such that the second array of magnets 208B extends parallel to second surface 206B and perpendicular to the first array of magnets 208A. The second array of magnets 208B is arranged conically on the second surface 206B such that the second array of magnets 208B comprises flux lines that extend perpendicular relative to second surface 206B surface.

First stator support structure 209A is centered about center axis CA and is spaced from first surface 206A of rotor 202 and the first array of magnets 208A. First stator support structure 209A is conical and tapers radially outward in the axial direction AD. First stator support structure 209A can also be formed from additive manufacturing. The first plurality of coils 210A is on first stator support structure 209A. The first plurality of coils 210A is conically arranged on first stator support structure 209A and faces the first array of magnets 208A. Each coil 210A of the first plurality of coils 210A includes first bearing windings 211A and first torque generating windings 212A. First bearing windings 211A are on first stator support structure 209A and face the first array of magnets 208A. First bearing windings 211A are parallel to the first array of magnets 208A. First torque generating windings 212A are also on first stator support structure 209A and face the first array of magnets 208A. First torque generating windings 212A are parallel to the first array of magnets 208A.

Second stator support structure 209B is centered about center axis CA and is spaced from second surface 206B of rotor 202 and the second array of magnets 208B. Second stator support structure 209B is conical and tapers radially inward in the axial direction AD. Second stator support structure 209B can also be formed from additive manufacturing. The second plurality of coils 210B is on second stator support structure 209B. The second plurality of coils 210B is conically arranged on second stator support structure 209B and faces the second array of magnets 208B. Each coil 210B of the second plurality of coils 210B includes second bearing windings 211B and second torque generating windings 212B. Second bearing windings 211B are on second stator support structure 209B and face the second array of magnets 208B. Second bearing windings 211B are parallel to the second array of magnets 208B. Second torque generating windings 212B are also on second stator support structure 209B and face the second array of magnets 208B. Second torque generating windings 212B are parallel to the second array of magnets 208B.

When electrical current is directed through the first plurality of coils 210A, the electrical current passing through first bearing windings 211A creates a magnetic flux that is angled relative to the axial direction AD and the radial direction and that interacts with the first array of magnets 208A to axially and radially space rotor core 204 away from the first plurality of coils 210A. Electrical current is also directed through the second plurality of coils 210B. The electrical current passing through second bearing windings 211B creates a magnetic flux that is angled relative to the axial direction AD and to the radial direction and that interacts with the second array of magnets 208B to axially and radially space rotor core 204 away from the second plurality of coils 210B. With first bearing windings 211A repelling rotor core 204 in the axial direction AD and second bearing winding windings 211B repelling rotor core 204 against the axial direction, rotor core 204 is axially and radially balanced between the first plurality of coils 208A and the second plurality of coils 208B. The electrical current passing through first torque generating windings 212A will create a radial-axial magnetic flux that interacts with the first array of magnets 208A to rotate rotor 202. The electrical current passing through second torque generating windings 212B will create a radial-axial magnetic flux that interacts with the second array of magnets 208B to rotate rotor 202.

FIG. 6 is a cross-sectional view of mixed flux motor 300. As shown in FIG. 6, mixed flux motor 300 includes rotor 302, rotor core 304, convex surface 306, an array of magnets 308, first stator support structure 309A, second stator support structure 309B, first plurality of coils 310A, and second plurality of coils 310B. The first plurality of coils 310A includes first bearing windings 311A and first torque generating windings 312A. The second plurality of coils 310B includes second bearing windings 311B and second torque generating windings 312B.

Rotor core 304 and convex surface 306 can be formed from additive manufacturing. Convex surface 306 is spherical or ellipsoidal and is formed on rotor core 304. Convex surface 306 extends in the axial direction AD and in a radial direction relative to center axis CA such that convex surface 306 is non-parallel with center axis CA and non-perpendicular with center axis CA. The array of magnets 308 is connected to convex surface 306 of rotor 302, is arranged around center axis CA, and is arranged to match a profile of convex surface 306. The array of magnets 308 is arranged on the convex surface 306 such that the array of magnets 308 comprises flux lines that extend perpendicular relative to convex surface 308 surface.

First stator support structure 309A is centered about center axis CA and is spaced from convex surface 306 of rotor 302 and the array of magnets 308. First stator support structure 309A is concave and curved to complement the profile of convex surface 306. First stator support structure 309A can also be formed from additive manufacturing. The first plurality of coils 310A is on first stator support structure 309A. The first plurality of coils 310A is arranged on first stator support structure 309A and faces the array of magnets 308. Each coil 310A of the first plurality of coils 310A includes first bearing windings 311A and first torque generating windings 312A. First bearing windings 311A are on first stator support structure 309A and face the array of magnets 308. First bearing windings 311A are parallel to the array of magnets 308. First torque generating windings 312A are also on first stator support structure 309A and face the array of magnets 308. First torque generating windings 312A are parallel to the array of magnets 308.

Second stator support structure 309B is centered about center axis CA and is spaced from convex surface 306 of rotor 302 and the array of magnets 308. Second stator support structure 309B is positioned such that rotor core 304 is between first stator support structure 309A and second stator support structure 309B in the axial direction AD. Second stator support structure 209B is concave and curved to complement the profile of convex surface 306. Second stator support structure 309B can also be formed from additive manufacturing. The second plurality of coils 310B is on second stator support structure 309B. The second plurality of coils 310B is arranged on second stator support structure 309B and faces the second array of magnets 308B. Each coil 310B of the second plurality of coils 310B includes second bearing windings 311B and second torque generating windings 312B. Second bearing windings 311B are on second stator support structure 309B and face the array of magnets 308. Second bearing windings 311B are parallel to the array of magnets 308. Second torque generating windings 312B are also on second stator support structure 309B and face the array of magnets 308. Second torque generating windings 312B are parallel to the array of magnets 308.

When electrical current is directed through the first plurality of coils 310A, the electrical current passing through first bearing windings 311A creates a magnetic flux that is angled relative to both the axial direction AD and to a radial direction relative to center axis CA. This angled magnetic flux of first bearing windings 311A interacts with the array of magnets 308 to axially and radially space rotor core 304 away from the first plurality of coils 310A. Electrical current is also directed through the second plurality of coils 310B. The electrical current passing through second bearing windings 311B also creates a magnetic flux that is angled relative to both the axial direction AD and to a radial direction relative to center axis CA. This angled magnetic flux of second bearing windings 311B interacts with the array of magnets 308 to axially and radially space rotor core 304 away from the second plurality of coils 310B. With first bearing windings 311A stabilizing rotor core 304 in the axial direction AD and second bearing winding windings 311B repelling rotor core 304 against the axial direction, rotor core 304 is axially and radially balanced between the first plurality of coils 308A and the second plurality of coils 308B. The electrical current passing through first torque generating windings 312A will create a radial-axial magnetic flux that interacts with the array of magnets 308 to rotate rotor 302. The electrical current passing through second torque generating windings 312B will create a radial-axial magnetic flux that interacts with the array of magnets 308 to rotate rotor 302.

Figure 7:
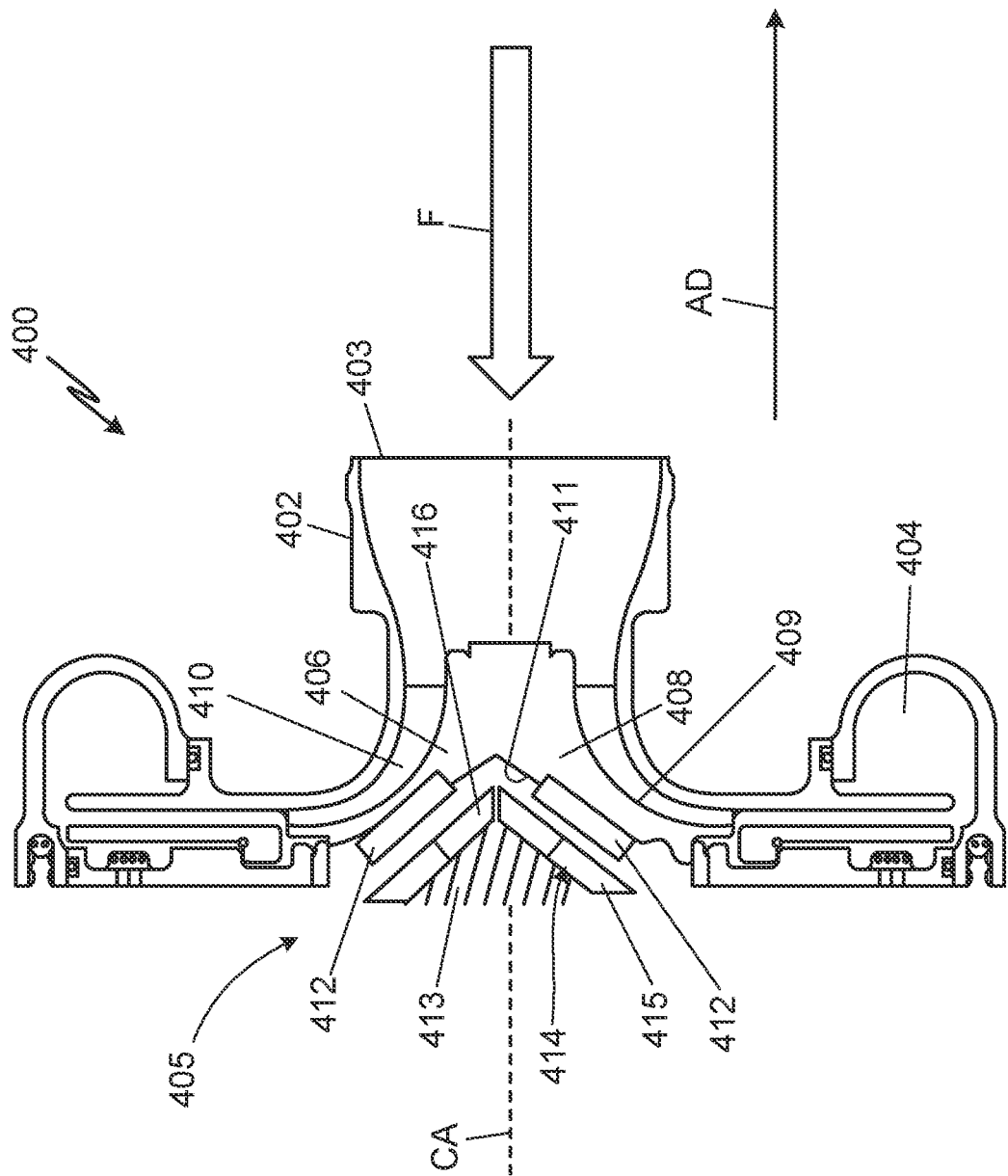
FIG. 7 is a cross-sectional view of an impeller assembly with a motor having a magnetic bearing integrated into the motor, and the motor and the magnetic bearing both having a mixed flux that is angled between a center axis of the assembly and a radial direction.

FIG. 7 is a cross-sectional view of impeller assembly 400 with a motor that includes magnetic bearings integrated into the motor. Both the motor and the integrated magnetic bearings have a flux that is angled relative to center axis CA and angled relative to a radial direction. As shown in FIG. 7, impeller assembly 400 includes housing 402, inlet 403, outlet 404, and drive assembly 405. Drive assembly 405 includes impeller 406 with hub 408, flow surface 409, blades 410, and radially inner surface 411. Drive assembly 405 also includes an array of magnets 412, stator support structure 413, and a plurality of coils 414. Each coil 414 of the plurality of coils includes bearing windings 415 and torque generating windings 416.

Housing 402 covers impeller 406 and forms inlet 403. Flow surface 409 of impeller 406 is formed on hub 408 and extends axially from inlet 403 and turns radially to outlet 404. Blades 410 extend axially and radially from flow surface 409 of impeller 406. Radially inner surface 411 is formed on a back side of hub 408 and is radially inward from flow surface 409. Radially inner surface 411 is conical, faces toward center axis CA, and tapers radially inward in the axial direction AD. The array of magnets 412 are connected to radially inner surface 411. The array of magnets 412 is conically arranged on radially inner surface 411 to match a profile of radially inner surface 411. The array of magnets 412 includes a magnetic flux that is angled relative to the center axis CA and to the radial direction.

Stator support structure 413 is also conical and tapers radially inward relative to center axis CA in the axial direction. The plurality of coils 414 is conically arranged on stator support structure 413 and radially and axially faces the array of magnets 412. Each coil 414 of the plurality of coils 414 angles radially inward relative to center axis CA in the axial direction. When electrical current is directed into the plurality of coils 414, the electrical current passing through bearing windings 415 creates a magnetic flux that is angled between center axis CA and a radial direction and that interacts with the array of magnets 412 to levitate impeller 411 axially and radially away from the plurality of coils 414. The electrical current passing through torque generating windings 416 will create a magnetic flux that is angled relative to center axis CA and to a radial direction. The array of magnets 412 also includes a magnetic flux that is angled relative to the center axis CA and to the radial direction. When the magnetic flux of that interacts with the array of magnets 412 to rotate impeller 406 and draw flow F into inlet 403.

Discussion of Possible Embodiments

The following are non-exclusive descriptions of possible embodiments of the present invention.

An assembly includes a rotor shaft extending in an axial direction along a center axis of the assembly and a flange extending radially outward from the rotor shaft and circumferentially around the rotor shaft. An axial flux motor extends circumferentially around the rotor shaft. The axial flux motor includes an array of magnets, a stator support structure, and a plurality of coils. The array of magnets extending circumferentially around the rotor shaft. The stator support structure extends circumferentially around the rotor shaft and faces the flange. The plurality of coils extends circumferentially around the rotor shaft and faces the array of magnets in the axial direction. Each coil of the plurality of coils includes bearing windings and torque generating windings on the stator support structure. Both the bearing windings and the torque generating windings face the array of magnets in the axial direction.

The assembly of the preceding paragraph can optionally include, additionally and/or alternatively, any one or more of the following features, configurations and/or additional components:

a radial flux motor comprising: a second array of magnets on the rotor shaft; a second stator support structure extending circumferentially around the second array of magnets on the rotor shaft; a second plurality of coils on the second stator support structure and extending circumferentially around the second array of magnets and spaced radially from the second array of magnets, and wherein each coil of the second plurality of coils comprises: second bearing windings on the second stator support structure and spaced radially from the second array of magnets; and second torque generating windings on the second stator support structure and spaced radially from the second array of magnets;

a second radial flux motor comprising: a third array of magnets on the rotor shaft; a third stator support structure extending circumferentially around the third array of magnets on the rotor shaft; a third plurality of coils on the third stator support structure and extending circumferentially around the third array of magnets and spaced radially from the third array of magnets, and wherein each coil of the third plurality of coils comprises: third bearing windings on the third stator support structure and spaced radially from the third array of magnets; and third torque generating windings on the third stator support structure and spaced radially from the third array of magnets;

the axial flux motor is disposed in the axial direction between the radial flux motor and the second radial flux motor;

a second flange extending radially outward from the rotor shaft and circumferentially around the rotor shaft; a second axial flux motor extending circumferentially around the rotor shaft, wherein the second axial flux motor comprises: a third array of magnets on the second flange and extending circumferentially around the rotor shaft; a third stator support structure extending circumferentially around the rotor shaft and facing the second flange; a third plurality of coils on the third stator support structure, wherein the third plurality of coils extends circumferentially around the rotor shaft and faces the third array of magnets in the axial direction, wherein each coil of the third plurality of coils comprises: third bearing windings on the third stator support structure and facing the third array of magnets in the axial direction; and third torque generating windings on the third stator support structure and facing the third array of magnets in the axial direction; and/or the radial flux motor is disposed in the axial direction between the axial flux motor and the second axial flux motor.

In another example, an assembly includes a rotor shaft extending in an axial direction along a center axis of the assembly and a flange extending radially outward from the rotor shaft and circumferentially around the rotor shaft. An axial flux motor extends circumferentially around the rotor shaft. The axial flux motor includes a first array of magnets on the flange that extends circumferentially around the rotor shaft. A first stator support structure extends circumferentially around the rotor shaft and faces the flange. A first plurality of coils is on the first stator support structure. The first plurality of coils extends circumferentially around the rotor shaft and faces the first array of magnets in the axial direction. Each coil of the first plurality of coils includes both first bearing windings and first torque generating windings. The first bearing windings are on the first stator support structure and face the first array of magnets in the axial direction. The first torque generating windings are also on the first stator support structure and face the first array of magnets in the axial direction. The assembly also includes a radial flux motor. The radial flux motor includes a second array of magnets on the rotor and a second stator support structure extending circumferentially around the second array of magnets on the rotor shaft. A second plurality of coils is on the second stator support structure. The second plurality of coils extends circumferentially around the second array of magnets and is spaced radially from the second array of magnets. Each coil of the second plurality of coils includes second bearing windings and second torque generating windings. The second bearing windings are on the second stator support structure and are spaced radially from the second array of magnets. The second torque generating windings are on the second stator support structure and are spaced radially from the second array of magnets.

The assembly of the preceding paragraph can optionally include, additionally and/or alternatively, any one or more of the following features, configurations and/or additional components:

a second radial flux motor comprising: a third array of magnets on the rotor shaft; a third stator support structure extending circumferentially around the third array of magnets on the rotor shaft; a third plurality of coils on the third stator support structure and extending circumferentially around the third array of magnets and spaced radially from the third array of magnets, and wherein each coil of the third plurality of coils comprises: third bearing windings on the third stator support structure and spaced radially from the third array of magnets; and third torque generating windings on the third stator support structure and spaced radially from the third array of magnets;

the axial flux motor is disposed in the axial direction between the radial flux motor and the second radial flux motor;

a second flange extending radially outward from the rotor shaft and circumferentially around the rotor shaft; a second axial flux motor extending circumferentially around the rotor shaft, wherein the second axial flux motor comprises: a third array of magnets on the second flange and extending circumferentially around the rotor shaft; a third stator support structure extending circumferentially around the rotor shaft and facing the second flange; a third plurality of coils on the third stator support structure, wherein the third plurality of coils extends circumferentially around the rotor shaft and faces the third array of magnets in the axial direction, wherein each coil of the third plurality of coils comprises: third bearing windings on the third stator support structure and facing the third array of magnets in the axial direction; and third torque generating windings on the third stator support structure and facing the third array of magnets in the axial direction; and/or the radial flux motor is disposed in the axial direction between the axial flux motor and the second axial flux motor.

In another example, a mixed flux motor includes a rotor with a surface extending in an axial direction relative to a center axis and in a radial direction relative to the center axis such that the surface is non-parallel with the center axis and non-perpendicular with the center axis. An array of magnets are connected to the surface of the rotor and extend parallel to the surface of the rotor. The array of magnets is arranged around the center axis. A stator support structure is centered on the center axis and spaced from the surface of the rotor and the array of magnets. A plurality of coils is on the stator support structure and faces the array of magnets. Each coil of the plurality of coils includes bearing windings and torque generating windings on the stator support structure. The bearing windings face the array of magnets and are parallel to the array of magnets. The torque generating windings face the array of magnets and are parallel to the array of magnets.

The mixed flux motor of the preceding paragraph can optionally include, additionally and/or alternatively, any one or more of the following features, configurations and/or additional components:

the surface of the rotor is conical, the array of magnets are arranged conically on the surface of the rotor, the stator support structure is conical, and the plurality of coils are arranged conically about the central axis;

a second conical surface on the rotor, wherein the surface tapers radially outward in the axial direction relative to the center axis, and wherein the second conical surface tapers radially inward relative to the center axis in the axial direction; a second array of magnets arranged conically on the second conical surface of the rotor shaft; a second stator support structure centered on the center axis, spaced from the second array of magnets, extending circumferentially around the second array of magnets, and wherein the second stator support structure is conical; and a second plurality of coils on the second stator support structure, wherein the second plurality of coils faces the second array of magnets, and wherein each coil of the second plurality of coils comprises: second bearing windings on the second stator support structure and facing the second array of magnets, wherein the second bearing windings are conically and parallel to the second array of magnets; and second torque generating windings on the second stator support structure and facing the second array of magnets, wherein the second torque generating windings are arranged conically and parallel to the second array of magnets;

the rotor is an impeller and the surface of the rotor is a radially inner surface of a hub of the impeller relative to the center axis, wherein the surface of the rotor is conical and faces toward the center axis and tapers radially inward in the axial direction, the stator support structure is conical and tapers radially inward relative to the center axis in the axial direction;

the array of magnets is arranged conically on the surface of the rotor such that the array of magnets comprise flux lines that extend perpendicular from the surface of the rotor, and wherein the plurality of coils are arranged conically on the stator support structure such that each coil angles radially inward relative the center axis in the axial direction;

the surface of the rotor is convex and the stator support structure is concave and extends circumferentially around the surface of the rotor; and/or the rotor and the stator support structure are additively manufactured.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
    a rotor shaft extending in an axial direction along a center axis of the assembly;
    a flange extending radially outward from the rotor shaft and circumferentially around the rotor shaft;
    an axial flux motor extending circumferentially around the rotor shaft, wherein the axial flux motor comprises:
        an array of magnets on the flange and extending circumferentially around the rotor shaft;
        a stator support structure extending circumferentially around the rotor shaft and facing the flange;
        an axial position sensor on the stator support structure;
        a plurality of coils on the stator support structure, wherein the plurality of coils extends circumferentially around the rotor shaft and faces the array of magnets in the axial direction, and wherein each coil of the plurality of coils comprises:
            bearing windings on the stator support structure and facing the array of magnets in the axial direction; and
            torque generating windings on the stator support structure and facing the array of magnets in the axial direction, wherein the bearing windings and the torque generating windings are electrically connected such that the torque generating windings receive an electrical current from the bearing windings; and
    a controller, wherein the controller is in electrical communication with the axial position sensor and electrically connected to the bearing windings such that the bearing windings receive an electrical current from the controller.

2. The assembly of claim 1, further comprising:
    a radial flux motor comprising:
        a second array of magnets on the rotor shaft;
        a second stator support structure extending circumferentially around the second array of magnets on the rotor shaft;
        a second plurality of coils on the second stator support structure and extending circumferentially around the second array of magnets and spaced radially from the second array of magnets, and wherein each coil of the second plurality of coils comprises:
            second bearing windings on the second stator support structure and spaced radially from the second array of magnets; and
            second torque generating windings on the second stator support structure and spaced radially from the second array of magnets.

3. The assembly of claim 2, further comprising:
    a second radial flux motor comprising:
        a third array of magnets on the rotor shaft;
        a third stator support structure extending circumferentially around the third array of magnets on the rotor shaft;
        a third plurality of coils on the third stator support structure and extending circumferentially around the third array of magnets and spaced radially from the third array of magnets, and wherein each coil of the third plurality of coils comprises:
            third bearing windings on the third stator support structure and spaced radially from the third array of magnets; and third torque generating windings on the third stator support structure and spaced radially from the third array of magnets.

4. The assembly of claim 3, wherein the axial flux motor is disposed in the axial direction between the radial flux motor and the second radial flux motor.

5. The assembly of claim 2, further comprising:
a second flange extending radially outward from the rotor shaft and circumferentially around the rotor shaft;
a second axial flux motor extending circumferentially around the rotor shaft, wherein the second axial flux motor comprises:
   a third array of magnets on the second flange and extending circumferentially around the rotor shaft;
   a third stator support structure extending circumferentially around the rotor shaft and facing the second flange;
   a third plurality of coils on the third stator support structure, wherein the third plurality of coils extends circumferentially around the rotor shaft and faces the third array of magnets in the axial direction, wherein each coil of the third plurality of coils comprises:
      third bearing windings on the third stator support structure and facing the third array of magnets in the axial direction; and
      third torque generating windings on the third stator support structure and facing the third array of magnets in the axial direction.

6. The assembly of claim 5, wherein the radial flux motor is disposed in the axial direction between the axial flux motor and the second axial flux motor.

7. An assembly comprising:
a rotor shaft extending in an axial direction along a center axis of the assembly;
a flange extending radially outward from the rotor shaft and circumferentially around the rotor shaft;
an axial flux motor extending circumferentially around the rotor shaft, wherein the axial flux motor comprises:
   a first array of magnets on the flange and extending circumferentially around the rotor shaft;
   a first stator support structure extending circumferentially around the rotor shaft and facing the flange;
   an axial position sensor on the first stator support structure;
   a first plurality of coils on the first stator support structure, wherein the first plurality of coils extends circumferentially around the rotor shaft and faces the first array of magnets in the axial direction, and wherein each coil of the first plurality of coils comprises:
      first bearing windings on the first stator support structure and facing the first array of magnets in the axial direction; and
      first torque generating windings on the first stator support structure and facing the first array of magnets in the axial direction, wherein the first bearing windings and the first torque generating windings are electrically connected such that the first torque generating windings receive an electrical current from the first bearing windings; and
a radial flux motor comprising:
   a second array of magnets on the rotor shaft;
   a second stator support structure extending circumferentially around the second array of magnets on the rotor shaft;
   a second plurality of coils on the second stator support structure and extending circumferentially around the second array of magnets and spaced radially from the second array of magnets, and wherein each coil of the second plurality of coils comprises:
      second bearing windings on the second stator support structure and spaced radially from the second array of magnets; and
      second torque generating windings on the second stator support structure and spaced radially from the second array of magnets, wherein the second bearing windings and the second torque generating windings are electrically connected such that the second torque generating windings receive an electrical current from the second bearing windings; and
a controller, wherein the controller is in electrical communication with the axial position sensor, and wherein the controller is electrically connected to the first bearing windings such that the first bearing windings receive an electrical current from the controller, and wherein the controller is electrically connected to the second bearing windings such that the second bearing windings receive an electrical current from the controller.

8. The assembly of claim 7, further comprising:
a second radial flux motor comprising:
   a third array of magnets on the rotor shaft;
   a third stator support structure extending circumferentially around the third array of magnets on the rotor shaft;
   a third plurality of coils on the third stator support structure and extending circumferentially around the third array of magnets and spaced radially from the third array of magnets, and wherein each coil of the third plurality of coils comprises:
      third bearing windings on the third stator support structure and spaced radially from the third array of magnets; and
      third torque generating windings on the third stator support structure and spaced radially from the third array of magnets.

9. The assembly of claim 8, wherein the axial flux motor is disposed in the axial direction between the radial flux motor and the second radial flux motor.

10. The assembly of claim 7, further comprising:
a second flange extending radially outward from the rotor shaft and circumferentially around the rotor shaft;
a second axial flux motor extending circumferentially around the rotor shaft, wherein the second axial flux motor comprises:
   a third array of magnets on the second flange and extending circumferentially around the rotor shaft;
   a third stator support structure extending circumferentially around the rotor shaft and facing the second flange;
   a third plurality of coils on the third stator support structure, wherein the third plurality of coils extends circumferentially around the rotor shaft and faces the third array of magnets in the axial direction, wherein each coil of the third plurality of coils comprises:
      third bearing windings on the third stator support structure and facing the third array of magnets in the axial direction; and
      third torque generating windings on the third stator support structure and facing the third array of magnets in the axial direction.

11. The assembly of claim 10, wherein the radial flux motor is disposed in the axial direction between the axial flux motor and the second axial flux motor.

12. A mixed flux motor comprising:
- a rotor comprising a surface extending in an axial direction relative to a center axis and in a radial direction relative to the center axis such that the surface is non-parallel with the center axis and non-perpendicular with the center axis;
- an array of magnets connected to the surface of the rotor and extending parallel to the surface of the rotor, wherein the array of magnets is arranged around the center axis;
- a stator support structure centered on the center axis and spaced from the surface of the rotor and the array of magnets; and
- a plurality of coils on the stator support structure, wherein the plurality of coils faces the array of magnets, and wherein each coil of the plurality of coils comprises:
  - bearing windings on the stator support structure and facing the array of magnets, wherein the bearing windings are parallel to the array of magnets; and
  - torque generating windings on the stator support structure and facing the array of magnets, wherein the torque generating windings are parallel to the array of magnets;
- wherein the rotor is an impeller and the surface of the rotor is a radially inner surface of a hub of the impeller relative to the center axis, wherein the surface of the rotor is conical and faces toward the center axis and tapers radially inward in the axial direction, the stator support structure is conical and tapers radially inward relative to the center axis in the axial direction.

13. The mixed flux motor of claim 12, the array of magnets are arranged conically on the surface of the rotor, and the plurality of coils are arranged conically about the central axis.

14. The mixed flux motor of claim 12, wherein the rotor and the stator support structure are additively manufactured.

15. The mixed flux motor of claim 12, wherein the array of magnets is arranged conically on the surface of the rotor such that the array of magnets comprise flux lines that extend perpendicular from the surface of the rotor, and wherein the plurality of coils are arranged conically on the stator support structure such that each coil angles radially inward relative the center axis in the axial direction.

* * * * *